US007225150B2

(12) United States Patent
Wilton et al.

(10) Patent No.: US 7,225,150 B2
(45) Date of Patent: *May 29, 2007

(54) ELECTRONIC TRADING SYSTEM INCLUDING AN AUTO-ARBITRAGE FEATURE OR NAME SWITCHING FEATURE

(75) Inventors: Rosalyn S. Wilton, Kent (GB); David L. Silverman, Saint James, NY (US)

(73) Assignee: Reuters Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 11/266,404

(22) Filed: Nov. 4, 2005

(65) Prior Publication Data

US 2006/0053074 A1    Mar. 9, 2006

Related U.S. Application Data

(63) Continuation of application No. 10/325,982, filed on Dec. 23, 2002, which is a continuation of application No. 08/571,106, filed on Dec. 12, 1995, now Pat. No. 6,519,574.

(51) Int. Cl.
*G06F 17/60* (2006.01)

(52) U.S. Cl. .......................................... 705/35; 705/37

(58) Field of Classification Search ............ 705/35–37; 273/278
See application file for complete search history.

(56) References Cited

U.S. PATENT DOCUMENTS

| 3,573,747 A | 4/1971 | Adams et al. |
| 4,376,978 A | 3/1983 | Musmanno |
| 4,412,287 A | 10/1983 | Braddock, III |

(Continued)

FOREIGN PATENT DOCUMENTS

EP    0 399 850    11/1990

(Continued)

OTHER PUBLICATIONS

"Dahlberg moves to conversion of Sears units", Tony Carideo, Staff Writer. Star Tribune. Minneapolis Minn.: Feb. 29, 1992. p. 03.D; Article URL:http://gateway.proquest.com/openurl?ctx_ver=z39. 88-(An Article View from Proquest).

(Continued)

*Primary Examiner*—James Kramer
*Assistant Examiner*—Harish T. Dass
(74) *Attorney, Agent, or Firm*—Banner & Witcoff, Ltd.

(57) ABSTRACT

An electronic trading system includes a plurality of trader terminals for receiving credit parameter data, arbitrage parameter data, and trading data from a trading entity, and a computer connected to the plurality of trader terminals via a communications network that receives and stores the credit parameter data and the trading data. The system also includes a detector circuit or program for automatically detecting an available arbitrage opportunity including a plurality of trades based on the credit parameter data, the arbitrage parameter data, and the trading data. A similar electronic trading system includes an automatic name switch feature wherein the plurality of trader terminals receive name switch parameter data, credit parameter data, and trading data from the trading entity. A circuit or program automatically detects and executes available name switch transactions based on the credit parameter data, the name switch parameter data, and the trading data.

20 Claims, 13 Drawing Sheets

U.S. PATENT DOCUMENTS

| | | | |
|---|---|---|---|
| 4,745,559 | A | 5/1988 | Willis et al. |
| 4,750,135 | A | 6/1988 | Boilen |
| 4,903,201 | A | 2/1990 | Wagner |
| 5,077,665 | A | 12/1991 | Silverman et al. |
| 5,136,501 | A | 8/1992 | Silverman et al. |
| 5,305,200 | A | 4/1994 | Hartheimer et al. |
| 5,375,055 | A | 12/1994 | Togher et al. |
| 5,655,088 | A | 8/1997 | Midorikawa et al. |
| 6,456,982 | B1 * | 9/2002 | Pilipovic .................. 705/36 R |
| 6,519,574 | B1 | 2/2003 | Wilton et al. |

FOREIGN PATENT DOCUMENTS

| | | |
|---|---|---|
| EP | 0 407 026 | 1/1991 |
| EP | 0 411 748 | 2/1991 |
| EP | 0 491 455 | 6/1992 |
| EP | 0 512 702 | 11/1992 |
| GB | 1 489 571 | 10/1977 |
| GB | 2 275 296 | 8/1994 |
| GB | 2 275 297 | 8/1994 |
| GB | 2 275 298 | 8/1994 |
| GB | 2 277 177 | 10/1994 |
| GB | 2 277 178 | 10/1994 |
| GB | 2 277 389 | 10/1994 |
| WO | WO 93/15467 | 8/1993 |
| WO | WO 96/05563 | 2/1996 |
| WO | WO 97/08640 | 3/1997 |
| WO | WO 97/22072 | 6/1997 |

OTHER PUBLICATIONS

Rudi Weisweiller, "What Is Arbitrage", Published by Woodhead-Faulkner Limited, 1986, pp. 1-9.

HICSS-23,"Volume IV: Emerging Technologies and Applications", IEEE Computer Society Press, 1991.

"Trading Systems", Electronic Banking & Finance, 1988, pp. 8-9.

Michael B. Stevens, "Sea Change in Institutional Investing", American Banker, vol. 157, No. 164, pp. 1-4.

Clark et al., "Seasonalities In NYSE Bid-Ask Spreads And Stock Returns In January", Journal of Finance, vol. 47, No. 5, pp. 1-12.

Behof et al., "Future Shock Is Rattling The Future Pits", Business Week, Apr. 17, 1989, pp. 93-94.

Clarisse M. Persanyi, "Global Custody: Take A Journey To 1992", ABA Banking Journal, May 1990, p. 96.

Saul Hansell, "The Computer That Ate Chicago", Institutional Investor, Feb. 1989, pp. 180-188.

Donald P. Mazzella, "Flying High With Financial Databases", Wall Street Computer Review, Jun. 1985, pp. 36-44.

Clemons et al., "Barclays de Zoete Wedd's TRADE System", IEEE Computer Society Press, 1990, pp. 137-146.

"Distributed Transaction", Data Processing Handbook, New Edition, edited by Data Processing Society, published by Ohm Inc., Nov. 25, 1995. pp. 1102-1112 (No. 9, Chapter 8: Distributing Computing) with abridged translation.

Notice of Opposition to a European Patent in corresponding European Patent 0 873 549, dated May 7, 2002.

Letters from the Opponent to the European Patent Office dated Oct. 22, 2004 for the Opposition to European Patent No. 0,873,549.

Submission letter from the Opponent to the European Patent Office dated Sep. 13, 2005 for the Opposition to European Patent No. 0,873,549.

Document A11 identified on p. 2 of Cite No. 2.
Document A12 identified on p. 2 of Cite No. 2.
Document A13 identified on p. 2 of Cite No. 2.
Document A14 identified on p. 2 of Cite No. 2.
Document A15 identified on p. 2 of Cite No. 2.
Document A16 identified on p. 2 of Cite No. 2.
Document A17 identified on p. 2 of Cite No. 2.
Document A18 identified on p. 2 of Cite No. 2.
Document A19 identified on p. 2 of Cite No. 2.
Document A20 identified on p. 2 of Cite No. 2.
Document A21 identified on p. 2 of Cite No. 2.

Letter from Applicant to the European Patent Office dated Sep. 15, 2005 for the Opposition to European Patent No. 0,873,540.

Letter from Applicant to the European Patent Office dated Oct. 14, 2005 for the Opposition to European Patent No. 0,873,549.

Letter from Applicant to the European Patent Office dated Oct. 16, 2005 for the Opposition to European Patent No. 0,873,549.

Letter from the Opponent dated Sep. 13, 2005 for the Opposition to European Patent No. 0,873,549.

* cited by examiner

| TRADING ENTITY | S1 | S2 | S3 | S4 |
|---|---|---|---|---|
| S1 | — | 0 | 25 | 2 |
| S2 | 0 | — | 17 | 10 |
| S3 | 10 | 7 | — | 5 |
| S4 | 5 | 4 | 7 | — |

(DOLLARS IN INCREMENTS OF 1M)

| BIDS | OFFERS |
|---|---|
| ($S_1$) 3@ 1.00 | ($S_2$) 5@ 1.00 |
| ($S_3$) 7@ 0.90 | ($S_4$) 2@ 1.10 |
| BEST→ 1.00 | BEST→ 1.00 |

MARKET BOOK

FIG.3

| BIDS | OFFERS |
|---|---|
| ($S_1$) 3@ 1.00* | |
| ($S_3$) 7@ 0.90 | ($S_4$) 2@ 1.10 |
| BEST→ 0.90 | BEST→ 1.10 |

$S_1$'S DISPLAY

FIG.4

| BIDS | OFFERS |
|---|---|
| | ($S_2$) 5@ 1.00* |
| ($S_3$) 7@ 0.90 | ($S_4$) 2@ 1.10 |
| BEST→ 0.90 | BEST→ 1.10 |

$S_2$'S DISPLAY

FIG.5

| BIDS | | OFFERS | |
|---|---|---|---|
| ($S_1$) 3@ 1.00 | | ($S_2$) 5@ 1.00 | |
| ($S_3$) 7@ 0.90* | | ($S_4$) 2@ 1.10 | |
| BEST→ | 1.00 | BEST→ | 1.00 |

$S_3$'s DISPLAY

FIG. 5A

| BIDS | | OFFERS | |
|---|---|---|---|
| ($S_1$) 3@ 1.00 | | ($S_2$) 5@ 1.00 | |
| ($S_3$) 7@ 0.90 | | ($S_4$) 2@ 1.10* | |
| BEST→ | 1.00 | BEST→ | 1.00 |

$S_4$'s DISPLAY

FIG. 6A

| AUTO-ARBITRAGE PARAMETER ENTRY | | | |
|---|---|---|---|
| INSTRUMENT | X | Y | Z |
| MIN. SPREAD | .01 | .05 | 0 |
| MIN. SIZE | 3M | 10M | 1M |
| MAX. SIZE | — | 11M | 20M |
| AVG. SPREAD OK | ☒ | ☒ | ☒ |
| AUTO-EXECUTE | ☒ | ☐ | ☐ |
| ALERT | ☐ | ☒ | ☒ |

[CANCEL] [OK]

FIG.8

AUTO-ARBITRAGE ALERT

ON INSTRUMENT [X]

BUY FROM [A] AT [1.0000]

SELL TO [B] AT [1.0200]

SPREAD [.02]   VALUE [6M]

( EXECUTE )   ( CANCEL )

FIG.9

| BANK S3-CREDIT AND NAME SWITCH PARAMETERS ||||||
|---|---|---|---|---|---|
| BANK | CREDIT LIMIT | CREDIT REMAIN | NAME SWITCH | MIN. SPREAD | MIN. AMOUNT | MAX. AMOUNT |
| S1 | 100M | 90M | NO | — | — | — |
| S2 | 50M | 50M | YES | .01 | 2M | 5M |
| S4 | 500M | 450M | YES | .02 | 2M | 100M |
|  |  |  |  |  | [OK] | [CANCEL] |

FIG. 13

| BANK S1-CREDIT AND NAME SWITCH PARAMETERS ||||||
|---|---|---|---|---|---|
| BANK | CREDIT LIMIT | CREDIT REMAIN | NAME SWITCH | MIN. SPREAD | MIN. AMOUNT | MAX. AMOUNT |
| S2 | 50M | 10M | YES | .01 | 2M | 5M |
| S3 | 10M | 10M | YES | — | — | — |
| S4 | 500M | 10M | YES | .02 | 5M | 10M |
|  |  |  |  |  | [OK] | [CANCEL] |

FIG. 14A

| BANK S2-CREDIT AND NAME SWITCH PARAMETERS ||||||
|---|---|---|---|---|---|
| BANK | CREDIT LIMIT | CREDIT REMAIN | NAME SWITCH | MIN. SPREAD | MIN. AMOUNT | MAX. AMOUNT |
| S1 | 10M | — | NO | — | — | — |
| S3 | 10M | 10M | YES | .01 | 5M | 20M |
| S4 | 50M | 10M | NO | — | — | — |
|  |  |  |  |  | [OK] | [CANCEL] |

FIG. 14B

| BANK S3-CREDIT AND NAME SWITCH PARAMETERS |||||||
|---|---|---|---|---|---|---|
| BANK | CREDIT LIMIT | CREDIT REMAIN | NAME SWITCH | MIN. SPREAD | MIN. AMOUNT | MAX. AMOUNT |
| S1 | 20M | 10M | YES | .01 | 5M | 10M |
| S2 | 5M | 5M | NO | — | — | — |
| S4 | 25M | 10M | YES | .03 | 10M | — |

[OK] [CANCEL]

FIG.14C

| BANK S4-CREDIT AND NAME SWITCH PARAMETERS |||||||
|---|---|---|---|---|---|---|
| BANK | CREDIT LIMIT | CREDIT REMAIN | NAME SWITCH | MIN. SPREAD | MIN. AMOUNT | MAX. AMOUNT |
| S1 | — | — | NO | — | — | — |
| S2 | 10M | 10M | YES | .01 | 5M | 20M |
| S3 | 20M | — | NO | — | — | — |

[OK] [CANCEL]

FIG.14D

ELECTRONIC TRADING SYSTEM INCLUDING AN AUTO-ARBITRAGE FEATURE OR NAME SWITCHING FEATURE

CROSS-REFERENCE TO RELATED CASES

This application is a continuation of U.S. application Ser. No. 10/325,982 filed Dec. 23, 2002, which is a continuation of U.S. application Ser. No. 08/571,106 U.S. Pat. No. 6,519,574 filed Dec. 12, 1995. These applications are hereby incorporated by reference in their entirety.

FIELD OF THE INVENTION

The present invention relates to an electronic trading system which automatically identifies arbitrage opportunities created by credit-related discrepancies within a market and optionally automatically executes the appropriate trades, thereby enabling a trading entity to extract low-risk trading profit from the market.

The present invention further relates to an electronic trading system which automatically and instantaneously enables less credit-worthy trading entities in a market to trade using the credit lines of more credit-worthy trading entities in the market, thereby creating additional market liquidity.

BACKGROUND

In electronic trading system for markets in which credit risks and settlement risks are born by trading parties, the trading parties input credit lines into the trading system which are used to limit a trading entity's exposure created by transactions with other trading entities on the system. For example, by entering a low or zero credit line for a particular trading counterparty, a trading entity prevents potential trades between itself and the potential counterparty. Thus, by adjusting a counterparty's credit line, a trading entity may limit its gross or net exposure (outstanding risk) based on transactions with individual counterparties and its total exposure to all counterparties.

In a matching system which enables trading entities to enter credit limits, such as those described in U.S. Pat. No. 5,136,501 and U.S. Pat. No. 5,375,055, the credit parameters input by the trading entities may result in situations in which a first trading entity, trading entity S1, enters an offer which matches a bid entered by a second trading entity, trading entity S2, but the system will not execute the trade because either trading entity S1 has not extended sufficient credit to trading entity S2, trading entity S2 has not extended sufficient credit to trading entity S1, or both. Otherwise stated, there is insufficient bilateral credit availability between trading entity S1 and trading entity S2. Notably, the trading entities may be individual banks and trading institutions and/or groups of banks and trading institutions.

Similarly, trading entity S2 may enter a bid with a higher price than an offer entered by trading entity S1. Again, S1 and S2 cannot trade with one another because there is insufficient bilateral credit availability between the two. In this instance, an "arbitrage" opportunity exists in that a third party, trading entity S3, which has sufficient bilateral credit with both trading entity S1 and trading entity S2, may buy from S1 at a low price and sell to S2 at a higher price, thereby obtaining an immediate, low-risk profit due to the credit discrepancies in the market.

The known electronic trading systems do not provide any means for automatically identifying an arbitrage opportunity created by credit discrepancies in the market and optionally automatically executing the appropriate transactions, thereby enabling trading entity S3 to automatically, efficiently and effectively capitalize on the arbitrage opportunity and increasing the liquidity of the market without the addition of new bids and offers. While the system described in U.S. Pat. No. 5,375,055 displays the best available offer and bid prices to market makers, thereby indicating that an arbitrage opportunity exists when there is a discrepancy between the two prices displayed, the '055 system does not provide any means for automatically identifying and/or capitalizing on the arbitrage opportunity. Furthermore, the known trading systems do not provide any means of ensuring that all trades needed to successfully complete the arbitrage transaction will occur prior to executing any of the trades such that trading entity S3 does not incur the risk of only one side of the arbitrage transaction being executed.

A related drawback of known electronic trading systems which accommodate markets in which the trading entities bear a credit and/or settlement risk is that these systems do not provide a means by which a less credit-worthy trading entity, trading entity S4, may trade with other trading entities using the credit line of a more credit-worthy trading entity. For example, if trading entity S4 enters a bid which is compatible with trading entity S2's offer, but trading entity S2 has not extended sufficient credit to trading entity S4, no transaction could occur in the known trading systems. However, if trading entity S4 were able to use another trading entity's (e.g., S1 or S3) credit line to complete the transaction (assuming that trading entity S1 or S3 has sufficient credit with trading entity S2 and S4) through an agreement between trading entity S4 and trading entity S1 or S3, the liquidity of the market would again be increased. This "name switch" procedure may be instantaneous (no discretion option is provided) or may be implemented to allow discretion of the part of the user in the context of an electronic trading system.

The practice of name switching in which one party trades under the credit lines of another party may currently be accomplished through the use of a broker. However, there are presently no electronic trading systems which can automatically, instantaneously, and effectively perform the name switch procedure.

SUMMARY OF THE PRESENT INVENTION

In view of the above discussion, it is an object of the present invention to provide an electronic trading system which automatically identifies arbitrage opportunities arising from price anomalies that arise due to credit discrepancies within a market.

It is a further object of the present invention to provide an electronic trading system which automatically and efficiently executes the trades necessary to complete an arbitrage transaction without risk to the trading entity, or automatically provides a trading entity with the option to initiate the arbitrage trade.

It is another object of the present invention to provide an electronic trading system which is capable of performing an automatic, instantaneous name switch operation whereby a less credit-worthy trading entity uses the credit lines of a more credit-worthy trading entity to execute a desired transaction which would not be otherwise available to the less credit-worthy trading entity due to lack of bilateral credit availability.

The auto-arbitrage and name switch features have different purposes and address different needs within a market.

The auto-arbitrage feature addresses the need for a means of enabling a trading entity to automatically and effectively avail itself of arbitrage opportunities without incurring significant risk. The name switch feature is a function of the commercial relationships between trading entities, whereby one entity utilizes uses the credit lines of another entity to obtain trades and compensates the other trading entity for the use of its credit lines. However, both features are implemented through similar functions provided within an electronic trading system.

An electronic trading system having an auto-arbitrage feature according to the present invention includes a plurality of trader terminals for receiving credit parameter data, arbitrage parameter data, and trading data from a trading entity and displaying trade information to the trading entity. The trading data includes bid and/or offer information input by the trading entity. The system further includes a computer connected to the plurality of trader terminals via a communications network which receives and stores the credit parameter data and the trading data from the plurality of trader terminals. The system also includes a detector circuit or program for automatically detecting an available arbitrage transaction including a plurality of trades based on the credit parameter data, the arbitrage parameter data, and the trading data; and a circuit or program for automatically executing the available arbitrage transaction by executing all (or none) of the plurality of trades.

An electronic trading system having a name switch feature according to the present invention includes a plurality of trader terminals for receiving credit parameter data, name switch parameter data, and trading data from a trading entity and displaying trade information to the trading entity. The trading data includes bid and/or offer information input by the trading entity. The system also includes a computer connected to the plurality of trader terminals via a communications network, wherein the computer receives and stores the credit parameter data, the name switch parameter data, and the trading data from the plurality of trader terminals. A circuit or program automatically detects available name switch transactions based on the credit parameter data, the name switch parameter data, and the trading data, and automatically executes available name switch transactions.

The electronic trading system according to the present invention is designed to take advantage of arbitrage opportunities that exist in a market due to credit discrepancies between the parties. This type of arbitrage is distinguishable from more traditional arbitrage in which price discrepancies are created by friction within the functioning of a market, such as the logistics of completing and settling transactions. This type of arbitrage can be eliminated as markets become more efficient. However, arbitrage opportunities based on credit discrepancies as addressed by the present invention will always exist because not all trading entities are willing to extend the same amount of credit to all other trading entities.

Also, the intra-market type of arbitrage accommodated by the system according to the present invention is distinguishable from inter-market arbitrage, for example, "spread" trading in commodity futures markets. Systems that accommodate spread trading, whereby, for example, a party trades one contract month for another contract month of the same commodity ("calendar spreads") or one commodity for another commodity, are known in the art. For example, the GLOBEX.RTM trading system developed by Reuters Limited of London, England accommodates these types of inter-market trades.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

BRIEF DESCRIPTION OF THE DRAWINGS

FIG. 3 provides a diagram of a market "book" including all bids and offers available in the market at a specific time.

FIG. 4 provides a diagram of trading entity S1's display screen which displays only those bids and offers which are available to trading entity S1 based on bilateral credit availability.

FIG. 5 provides a diagram of trading entity S2's display screen which displays only those bids and offers which are available to trading entity S2 based on bilateral credit availability.

FIG. 5A provides a diagram of trading entity S3's display screen, which displays only those bids and offers which are available to trading entity S3 based on bilateral credit availability.

FIG. 6A provides a diagram of trading entity S4's display screen, which displays only those bids and offers which are available to trading entity S4 based on bilateral credit availability.

FIG. 8 provides a diagram of a trading entity auto-arbitrage parameter entry screen used in the system according to the present invention.

FIG. 9 provides a diagram of an alert message generated and displayed by one embodiment of the system according to the present invention.

FIG. 13 provides a diagram of a name switch parameter entry screen used in the system according to the present invention.

FIGS. 14A–14D provide an illustration of sample credit parameter and name switch parameter entry screens for trading entities S1–S4 respectively.

DETAILED DESCRIPTION

Figures 1, 2:
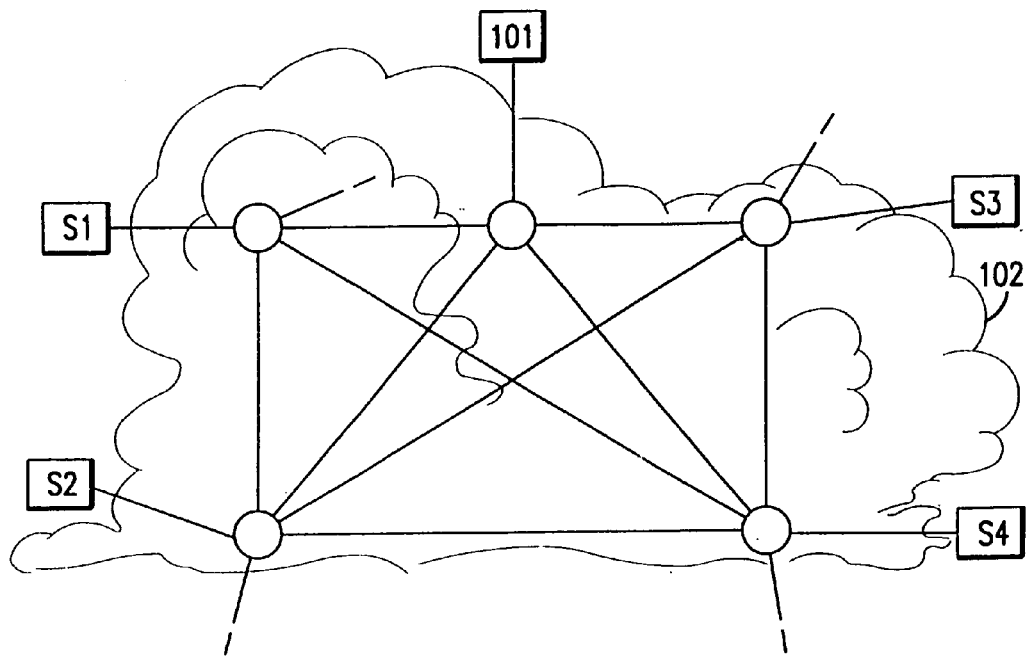
FIG. 1 provides a diagram of an electronic trading system according to the present invention, including a computer and four trader terminals.
FIG. 2 provides a diagram of a credit matrix including credit parameters entered by each trading entity in the system according to the present invention.

With reference to FIG. 1, an electronic trading system according to the present invention includes a computer 101 and four trader terminals S1, S2, S3, and S4. The trader terminals S1, S2, S3, and S4 are connected to computer 101 through a two-way communications network 102 which enables the transfer of information between the computer 101 and the four trader terminals S1–S4. The electronic trading system according to the present invention is envisioned to include numerous trading terminals and possibly intermediate nodes located between the trader terminals S1–S4 an computer 101 in the communication network. Therefore, the electronic trading system according to the present invention is not limited to the configuration shown in FIG. 1.

For purposes of the present description, the terms "trading entity," "trading party," "party," or "counterparty" refer to credit entities. For example, one trading entity or trading party (a credit entity) may, in fact, comprise a number of different branches, for example, a single bank having numerous branches located in different cities and/or countries. However, the credit limit entered into the system may be a group credit limit (a total credit limit extended to a group of financial institutions). A credit entity may also extend individual credit limits to each branch of a financial institution and a global limit which limits the total amount of credit that may be extended to the financial institution, even though the individual limits are not all met or exceeded. The credit matrix in the electronic trading system according to the present invention may be modified to accommodate the necessary credit structures. The communications network may be either a hardwired or wireless system.

A sample credit matrix for the four trading entities S1, S2, S3, and S4 is shown in FIG. 2. Entries in the credit matrix are entered by each trading entity prior to the commencement of or during trading. Each trading entity enters only its respective credit limits for each other trading entity, and credit limits entered into the other rows of the matrix by other trading entities are not accessible.

For example, with reference to FIG. 2, S1 has credit to trade with S3 and S4 but not S2. S2 may also trade with S3 and S4, but is unwilling to trade with S1 (i.e., has not extended credit to S1). Trading entities S3 and S4 may trade with all parties. The credit matrix used in the system according to the present invention may store monetary amounts of remaining credit (as shown in FIG. 2), ranking information such as alphabetic ranking indicating the extent to which one party wishes to deal with another party, yes/no values or any other type of appropriate filter information.

FIG. 3 provides a diagram of the "book" of all bids and offers that are available within the system including the highest available bid and the lowest available offer. This book is stored by computer 101 and optionally by the remote terminals S1–S4. As shown in FIG. 3, S1 has entered a bid to buy 3 million at a price of 1.00. S3 has entered a bid to buy 7 million at a price of 0.90. S2 has entered an offer to sell 5 million at a price of 1.00. S4 has entered an offer to sell 2 million at a price of 1.10.

FIGS. 4–6A provide schematic diagrams of the display screens of trading entities S1, S2, S3, and S4 respectively in an embodiment of the present invention that includes a credit filtering feature which filters bids and offers for bilateral credit availability between potential counterparties prior to displaying available bids and offers including the best available bid and offer. An asterisk ("*") next to a displayed bid or offer indicates that the bid or offer is the trading entity's own bid or offer and is therefore not available as a best bid or offer. In a different embodiment of the present invention (not shown), if a credit filtering system is not used to screen the trading entity's display screens, each trading entity's (S1's and S2's) display will be the same as S3's and S4's display shown in FIG. 6A.

Figure 6B:
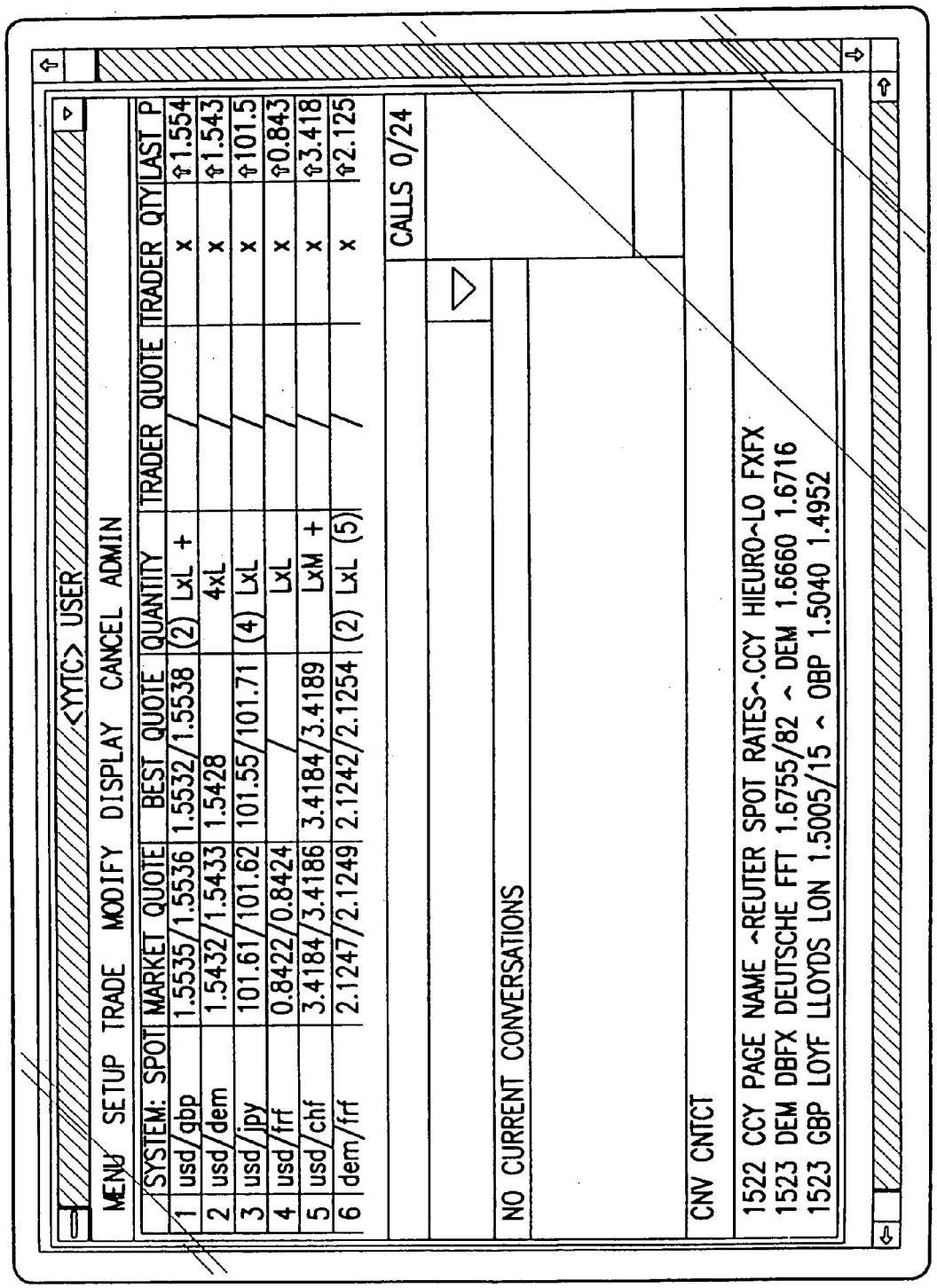
FIG. 6B provides a diagram of a display screen on which multiple trading instruments are displayed.

FIG. 6B shows an example of a practical implementation of the display screen of FIG. 6A wherein a number of trading instruments are simultaneously displayed.

With reference to FIG. 4, S1's display of bids and offers shows S3's bid and S4's offer because there is sufficient credit between S1 and S3 and S1 and S4 according to the credit matrix shown in FIG. 2. The display according to one embodiment of the present invention also shows S1's own bid. However, in alternate embodiment of the system according to the present invention, S1's own bid may be displayed in a separate window of the display screen or not displayed at all.

In the pictured embodiment of FIG. 4, in which the display is pre-filtered for bilateral credit availability, S1's display does not show S2's offer because S1 and S2 have not extended one another sufficient credit to trade according to the credit matrix of FIG. 2. S1's display would remain the same even if S1 was willing to extend credit to S2 but S2 was not willing to extend credit to S1. In the credit matrix of FIG. 2, however, neither S1 nor S2 has chosen to extend credit to the other. Thus, the best bid and/or offer available to the trading entities based on the stored credit matrix are respectively displayed to the trading entities.

With reference to FIG. 5, S2's display includes S3's bid and S4's offer because there is sufficient credit between S2 and S3 and between S2 and S4 according to the credit matrix shown in FIG. 2. S2's display may also display S2's own offer. In alternate embodiments, S2's offer may be displayed in a separate window of the display screen or not displayed at all. S2's display does not show S1's bid because there is not sufficient credit between S1 and S2 to permit a transaction between S1 and S2 according to the credit matrix of FIG. 2. Again, the best available bid and/or offer are displayed.

With reference to FIGS. 5A and 6A, the display screens of trading entities S3 and S4 show all bids and offers available in the market because S3 and S4 have sufficient credit with all counterparties. These display screens may also be seen by S1 and S2 if no pre-filtering feature is available in the system, or if S1 and S2 may select an unfiltered display mode. As discussed above with reference to FIGS. 4 and 5, S3 and S4 may see their own offers/bids, these offers/bids may be displayed in a separate window of the display screen, or these offers/bids may not be displayed at all. Again, the best bid and/or offer are displayed.

The display screens shown in FIGS. 5A and 6A illustrate that S3 and S4, by virtue of having a better credit position that S1 or S2, have access to transactions not available to S1 and S2 due to their worse credit position. For example, S3 or S4 may buy 3 million from S2 at a price of 1.00 and sell the 3 million to S1 for 1.00. These transactions are not available to S1 and S2. Instead, they may only be performed through S3 or S4 (trading entities with sufficient credit from S1 and S2). Therefore, a transaction opportunity for S3 or S4 is created due to credit discrepancies in the market.

In the transaction described above, wherein, for example, S3 buys from S2 and sells to S1, there is no profit to be made by S3 because the offer and bid prices are the same. While there is no financial incentive for S3 to facilitate the trade between S1 and S2, S3's decision to do so provides S3 with information as to the flow of trading instruments within the market. S3 knows that S2 has sold 3 million and that S1 has bought 3 million. Therefore, in some situations, e.g., when a trading entity needs information as to who is buying and selling a certain instrument, there may be a non-financial incentive for S3 to perform the two trades at the same price. However, in the more common situation, there is a clear financial incentive to S3 to perform the two trades if S3 can buy from S2 at a relatively low price and sell to S1 at a relatively high price, thereby making an immediate profit.

The operation of the electronic trading system according to the present invention will now be described in detail with reference to FIGS. 7–10.

Figure 7:
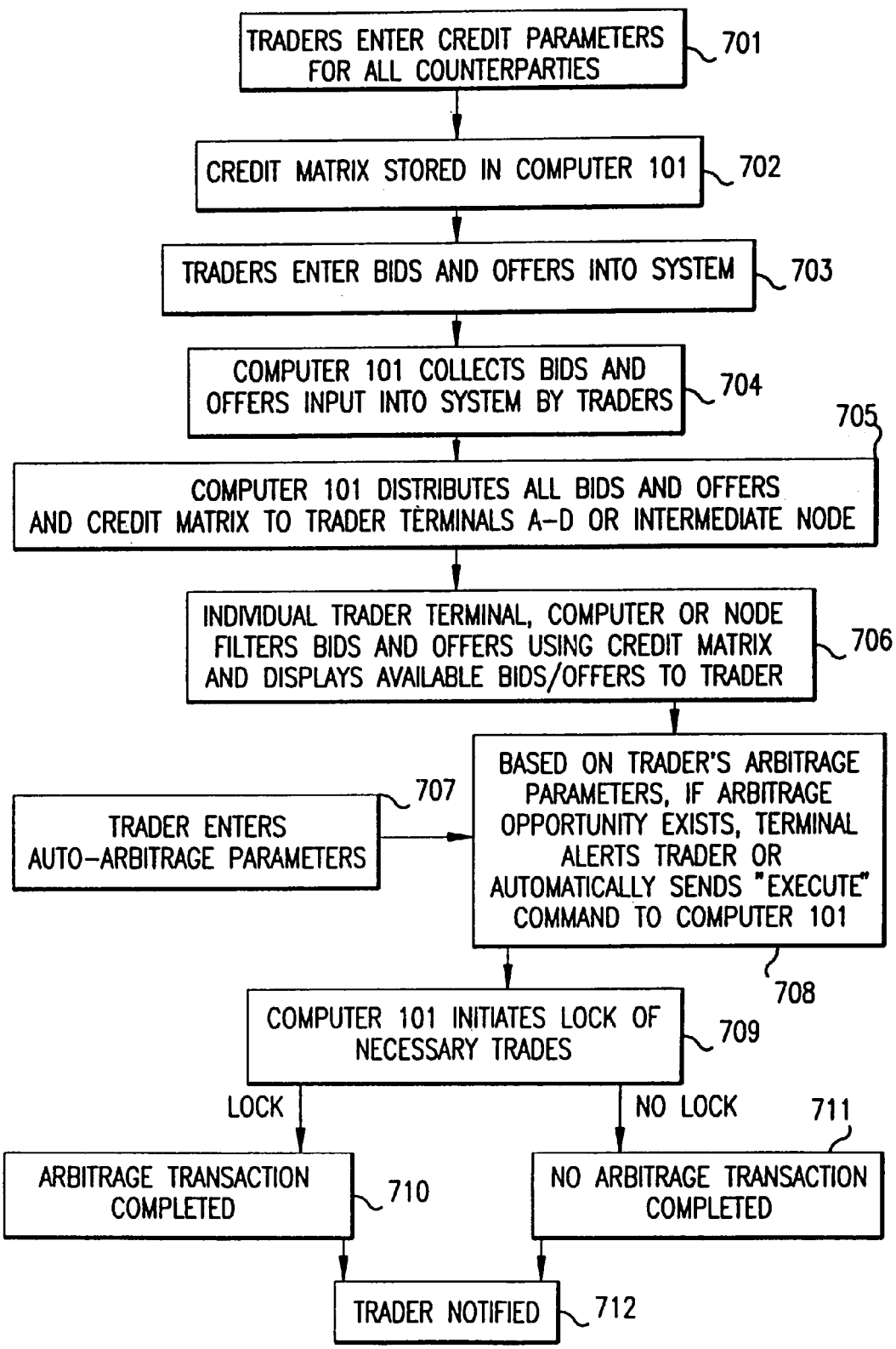
FIG. 7 provides a functional block diagram of the operation of one embodiment of the electronic trading system according to the present invention including an auto-arbitrage feature.

As illustrated in the functional block diagram of FIG. 7, a first embodiment of the electronic trading system according to the present invention performs the following steps:

701: The trading entities on the system, e.g., trading entities on trader terminals S1–S4 shown in FIG. 1, each enter credit parameters for transactions with the other trading entities on the system.

702: Next, the computer 101 stores the credit parameters (e.g., numerical limits, rankings, etc.) entered by the trading entities as a credit matrix (for example, the credit matrix shown in FIG. 2).

703: Trading entities enter bids and offers into the system using their respective remote terminals.

704: The computer 101 collects bids and offers entered into the system by the trading entities.

705: Once the computer 101 has collected the credit parameters, bids, and offers from the trading entities, the computer then distributes the bid and offer information as well as the credit matrix to each trading entity's terminal or to an intermediate node. With respect to the distribution function of the computer 101, the credit matrix may be distributed to the trader terminals S1–S4 or intermediate node initially, prior to entry of any bids or offers into the system, or distributed at the same time as offer and bid information is distributed.

706: Then, the trader terminals or intermediate node uses the credit matrix to filter the bids and offers, thereby determining which bids and offers are available to the respective trading entity based on bilateral credit availability. The available offers and bids are displayed to the trading entities S1–S4 as shown in FIGS. 4–6.

707: Prior to the commencement of or during trading activities on the system according to the present invention, each trading entity has the option of entering auto-arbitrage parameters including minimum spread information, minimum size information, and whether to automatically execute the arbitrage transactions or first alert the user of the arbitrage opportunity. One screen which may be used to enter auto-arbitrage options is illustrated in FIG. 8 (see additional discussion below with reference to FIG. 8).

708: Based on the trading entity's auto-arbitrage parameters, if the trader terminal determines that an arbitrage opportunity is available based on the trading entity's specified auto-arbitrage parameters, the trader terminal either automatically sends an "execute" command to computer 101 or automatically generates an alert message for the trading entity, such as the alert message shown in FIG. 9. If an alert is generated and the trading entity decides to pursue the arbitrage transaction, the trader terminal then sends an "execute" command to computer 101 in response to the trading entity's input.

709: Once computer 101 has received the "execute" command from the trader terminal, it automatically initiates a locking procedure whereby it attempts to lock all of the trades necessary to complete the arbitrage transaction. When the transactions are locked, the system will not accept any inputs that affect the status or terms of the locked offers and bids, thereby preventing a situation in which some of the trades are executed before others and then the later trades are no longer available when the system tries to execute them. For example, trading entity S3 could be stuck with 3 million instruments (e.g., U.S. dollars) which S3 cannot sell for the same or a better price because S1's bid has been taken by another trading entity, altered by S1, or expired while the system is executing the trade between S2 and S3. Thus, the locking feature is essential to the electronic trading system according to the present invention to insure that the middle trading entity (e.g., trading entity S3 in the above example) does not expose itself to any risk during the arbitrage transaction.

710: If computer 101 is able to lock all trades necessary to complete the arbitrage transaction, the computer automatically executes the trades.

711: However, if computer is not able to lock all necessary trades, none of the trades are executed.

712: In either instance, the trading entity is notified that an arbitrage transaction has or has not occurred and provided with any information about the completed arbitrage transaction if any. For example, trading entity S1 may be informed that its bid has been accepted by trading entity S3. Similarly, trading entity S2 may be notified only that its offer has been taken by trading entity S3. Trading entity S3 will be notified of the completion of its arbitrage transaction.

FIG. 8 provides an illustration of one possible configuration of an auto-arbitrage parameter entry screen. The screen includes a minimum spread entry for a plurality of instruments X, Y, and Z; a minimum size designation for instruments X, Y, and Z; "automatic execute" and "alert" options for each instrument, and an "ok" button to indicate when the trading entity has satisfactorily entered all auto-arbitrage parameters. The minimum spread determines the price differential needed before an auto-arbitrage opportunity will be recognized by the trader terminal (or the computer 101 as discussed below with reference to FIG. 10). For example, if "0" is entered, the trader terminal will identify an arbitrage opportunity whenever the trading entity can buy and sell the minimum quantity for the same price. If "0.10" is entered, the trader terminal will identify an arbitrage opportunity whenever the trading entity can sell for a price "0.10" or more higher than the price at which the trading entity can buy. The minimum size determines the quantity required before an arbitrage opportunity is identified.

The "automatic execute" and "alert" options enable the trading entity to select whether the system will automatically execute an arbitrage transaction in response to a command to computer 101 from a remote terminal when an arbitrage opportunity is identified, or instead generate an alert message which is displayed to the trading entity (see FIG. 9) whereby the trading entity is provided with discretion as to whether or not to proceed with the arbitrage transaction.

Figure 10:
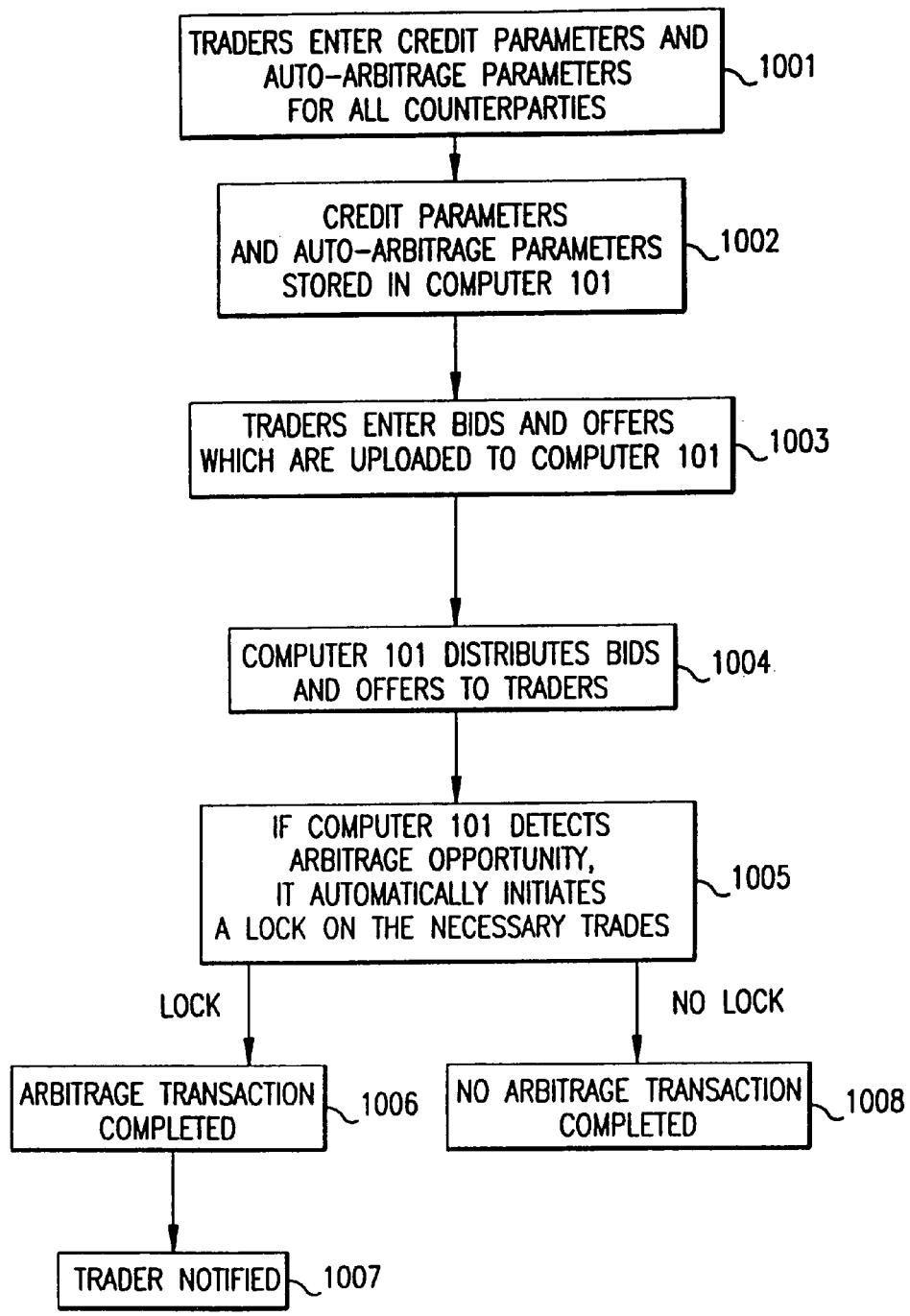
FIG. 10 provides a functional block diagram of the operation of another embodiment of the electronic trading system according to the present invention including an auto-arbitrage feature.

With reference to FIG. 10, the operation of a second embodiment of the electronic trading system according to the present invention includes the following steps:

1001: The trading entities enter credit and auto-arbitrage parameters (as described above with reference to FIG. 7) into their trader terminals. The trader terminals then transmit this parameter information to computer 101.

1002: The computer 101 stores the credit and arbitrage parameter information.

1003: The trading entities enter bids and offers into the system which are uploaded to and stored by computer 101.

1004: The computer then distributes the offers and bids to the trader terminals where the offers and bids are displayed. In this embodiment, there is no pre-filtering function which determines which bids and offers may be displayed to a trading entity based on credit availability. However, this feature may be added without changing the operation of this embodiment of the electronic trading system according to the present invention.

1005: Based on the stored credit and auto-arbitrage parameter information, if computer 101 detects an arbitrage opportunity, computer 101 automatically initiates the locking procedure whereby all trades necessary to complete the arbitrage transaction are locked to avoid any risk to the trading entity taking advantage of the arbitrage opportunity.

1006: If the computer 101 is able to lock all necessary trades, it executes the trades, thereby completing the arbitration transaction.

1007: The computer 101 then notifies the trading entity as to the results of the arbitration transaction.

1008: In the event that the computer 101 cannot lock all trades necessary to complete the arbitrage transaction, the computer will not execute any of the trades. Notification to the trading entity in this case may be provided but is not necessary if the trading entity's position has not been affected.

In the embodiment of the present invention shown in FIG. 10, the computer may also generate an alert message to the trading entity to enable the trading entity to decide whether to pursue the arbitrage option. However, if the trader terminal itself generates the alert message, the trader terminal is provided with logic whereby which it may determine which trades are actually available to the trading entity based on the trading entity's credit and auto-arbitrage parameters (as discussed above with reference to FIG. 7).

The electronic trading system according to the present invention is capable of automatically identifying arbitrage opportunities that involve a chain of multiple trades and multiple intermediaries, for example, a process by which S4 sells to S2, S2 sells to S3, and S3 sells to S1. In this sequence of trades, both S2 and S3 may profit, or one or both parties may agree to facilitate the trades to gain access to market flow information or for other non-financial purposes.

In the electronic trading system according to the present invention, it is crucial that the system be able to perform multiple trades simultaneously to avoid creating any risk to the trading entity conducting the arbitrage transaction. The multiple transactions must be treated as contingent transactions, wherein one transaction cannot take place unless the others are also available. For example, a computer which stores all offers and bids available in the system is useful to ensure that one transaction does not take place unless others also take place. As a result, it is difficult to incorporate the auto-arbitrage feature according to the present invention into a distributed trading system which does not have a repository of trade information as does the system shown in FIG. 1 because the coordination of locking of multiple transactions in a distributed system (one without a computer) is significantly more complex.

Figure 11A:
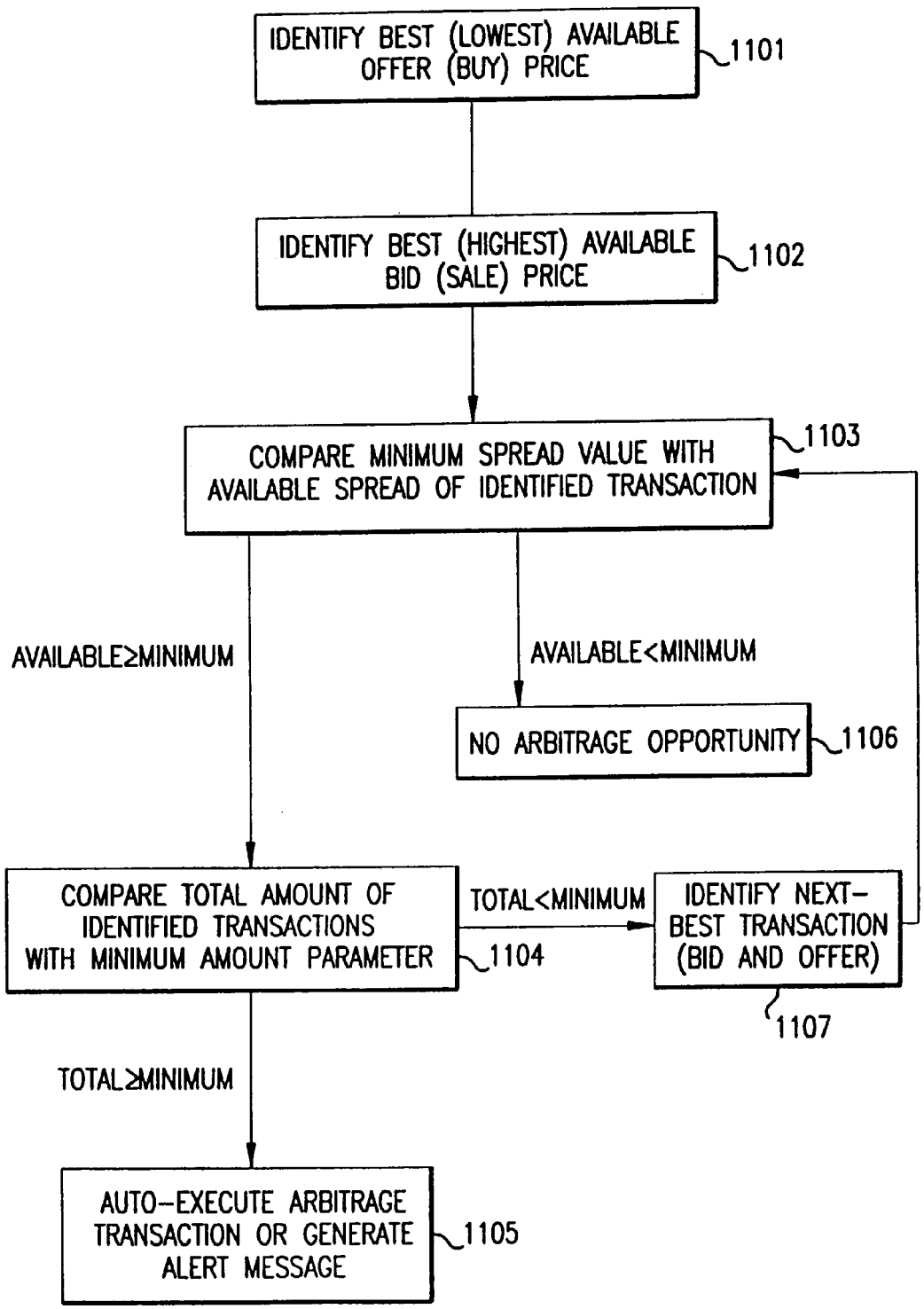
FIGS. 11A and 11B provide functional block diagrams of the arbitrage detection operation of the system according to the present invention.
Figure 11B:
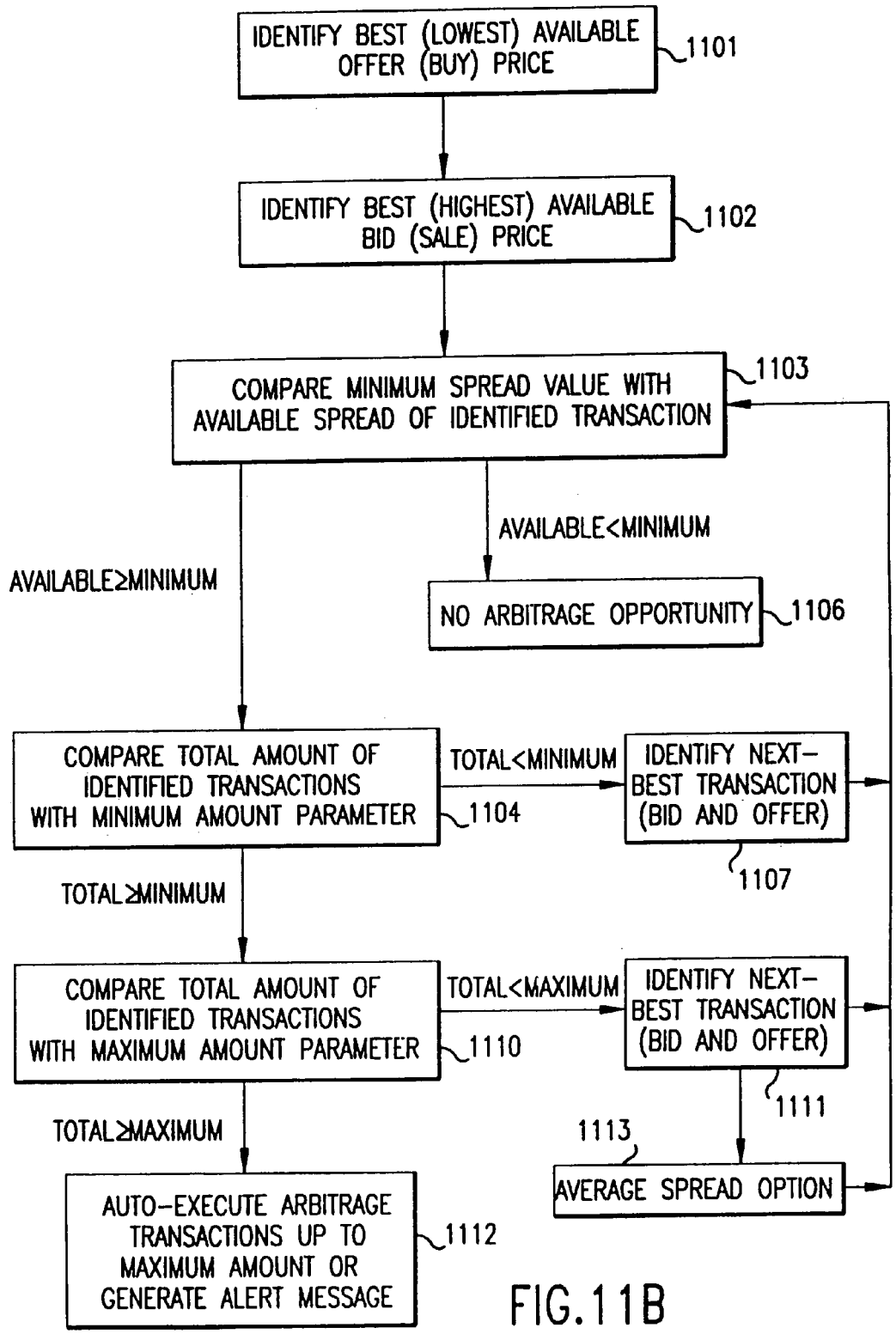

With reference to FIGS. 11A and 11B, the arbitrage opportunity identification process will now be described in greater detail. This process, which may be automatically performed by computer 101 or trader terminals S1–S4, includes the following steps:

1101: Based on stored credit parameter information, the computer 101 or trader terminal (e.g., any of S1–S4) identifies the best bid price available to a trading entity.

1102: Similarly, using the stored credit parameter information, the computer 101 or trader terminal identifies the best offer price available to that trading entity.

1103: Using the auto-arbitrage "minimum spread" parameter entered by the trading entity (see FIG. 8), the computer 101 or trader terminal compares the minimum spread value with the spread between the identified offer and bid prices.

1104: If the spread between the best offer and bid prices is greater than or equal to the minimum spread value entered by the trading entity, the computer 101 or trader terminal then compares the "minimum amount" value entered by the trading entity with the total amount of all identified arbitrage transactions. If only the best bid and offer have been identified, the total amount is the lesser of the available amounts of the best bid and offer. For example, if the bid is for 3 million but the offer is only for 2 million, the computer 101 or trader terminal will compare the minimum amount value with 2 million (the amount that can be bought and sold). If the best bid and offer and the next-best bid and offer have been identified (as described below in step 1107), the total amount is determined by adding the available amount of each transaction. The computer 101 will determine the optimum amount available by automatically identifying the best possible combination(s) of arbitrage transactions available to the trading entity.

1105: If the total amount that can be traded is greater than or equal to the minimum amount parameter, the computer 101 either (1) initiates the locking procedure described above with reference to FIGS. 7 and 10 whereby both transactions are locked to prevent risk to the trading entity or (2) generates an alert message (see FIG. 9) which is transmitted to the trading entity. If the trader terminal identifies the arbitrage opportunity, the trader terminal either (1) automatically sends an "execute" command to computer 101 or (2) generates an alert signal which is displayed to the trading entity (see FIG. 9).

1106: If the spread available is less than the minimum spread value entered by the trading entity, no arbitrage opportunity exists.

1107: If the amount available is less than the minimum amount value entered by the trading entity, the computer 101 identifies the next best transaction available to the trading entity and performs the minimum spread and minimum amount analysis again to try to build up the total amount of the transaction to satisfy the minimum amount parameter.

An alternative operation of the system according to the present invention is illustrated in FIG. 11B. The operation illustrated in FIG. 11B is similar to that described in FIG. 11A, but includes several additional steps. As shown in FIG. 11B, when the minimum amount requirement of step 1104 is satisfied, the computer 101 then compares the total amount of the arbitrage transaction with the maximum amount parameter entered by the trading entity (step 1110).

1111: If the total size is less than the maximum amount, the computer 101 identifies the next-best transaction available to the trading entity and evaluates this transaction to attempt to build up the amount of the transaction to the maximum amount parameter. If the trading entity has not entered a maximum amount parameter, the computer 101 automatically continues to add the next-best transactions until no further transactions are available based on the other name switch parameters and then executes the transactions.

1112: If the total amount that can be traded is greater than or equal to the maximum amount parameter, the computer 101 either (1) initiates the locking procedure described above with reference to FIGS. 7 and 10 whereby all transactions up to the maximum amount are locked to prevent risk to the trading entity or (2) generates an alert message (see FIG. 9) which is transmitted to the trading entity.

1113: If an "average spread OK" option is selected by the trading entity (see FIG. 8), the computer 101 may continue to identify bids and offers which can be traded but have a spread less than the minimum spread set by the trading entity provided that the weighted average of the identified bids and offers having a minimum or greater spread and the identified bids and offers having a below-minimum spread remains equal to or greater than the minimum spread set by the trading entity.

Once the arbitrage transaction has been completed, acknowledgment signals may be generated by the computer 101 and sent to the appropriate trader terminals. The generation of these acknowledgment signals may be accomplished, for example, using the acknowledgment generation system described in U.S. patent application Ser. No. 08/364,009, filed Dec. 27, 1994, and incorporated herein by reference.

Figure 12:
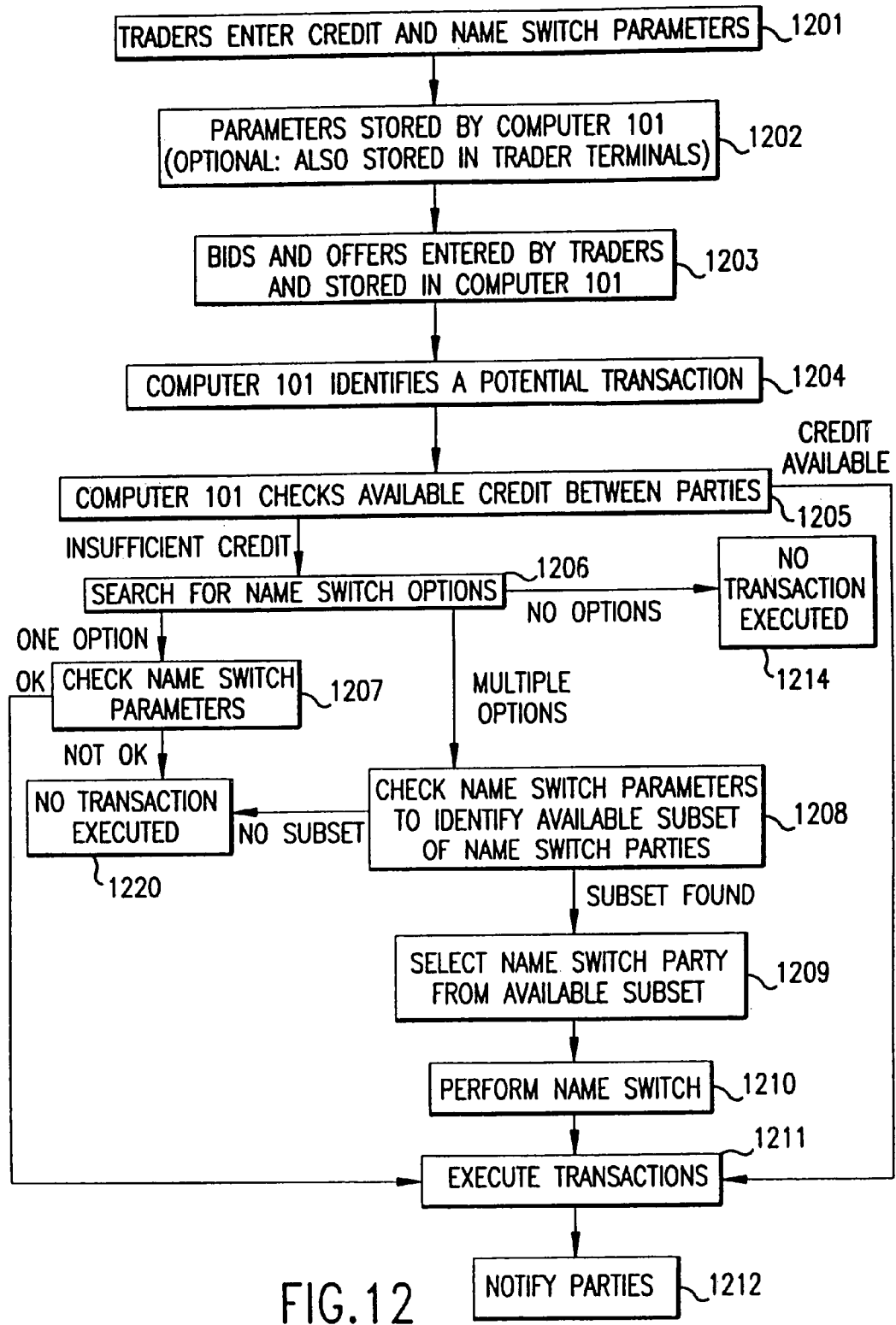
FIG. 12 provides a functional block diagram of another embodiment of the electronic trading system according to the present invention including a name switch feature.

With reference to FIG. 12, the operation of another embodiment of the electronic trading system having a name switch feature according to the present invention includes the following steps:

1201: The trading entities enter credit and name switch parameters into their trader terminals (e.g, any of S1–S4), e.g., via a screen such as that shown in FIG. 13. The trader terminals then transmit the parameters to the computer 101.

1202: The parameters are stored in computer 101 and optionally stored in trader terminals, e.g., S1–S4.

1203: Bids and offers entered by trading entities on the system are stored in computer 101.

1204: The computer 101 identifies a potential transaction.

1205: The computer checks the amount of available credit between the parties to the transaction.

1206: If there is insufficient credit available between the parties, the computer 101 searches for name switch possibilities based on name switch parameters entered by the traders into the system. For example, the computer may search for those parties that indicate "yes" in the "name switch" column of the entry screen shown in FIG. 13.

1207: If only one name switch option is identified by the computer 101, the computer then checks other name switch parameters entered by the trader, for example, minimum spread, minimum size, maximum size and remaining credit parameters as shown in FIG. 13. These criteria must be satisfied for both parties to the transaction. For example, with reference to the name switch parameters shown in FIG. 13, to determine whether there is a sufficient minimum spread for a party to facilitate a transaction between parties S2 and S4, the computer may either select the larger of the two minimum spread values (i.e., "0.02", the value entered for trader S4) or combine the two spreads (i.e., "0.03") and use the combined value to determine whether a name switch can occur.

An example of the name switch option determination will now be provided. It is assumed that a transaction is desired between trading entities S2 and S4. However, there is insufficient bilateral credit between S2 and S4 to enable execution of the transaction. Therefore, computer 101 searches for a trading entity such as S3 which has entered a "yes" in its name switch category for both S2 and S4 (see FIG. 14C). The computer 101 then compares the bid-offer spread of the transaction between S2 and S4 with the maximum of the minimum spread set by S3 for trading entities S2 and S4. As shown in FIG. 14C, S3 has entered a 0.01 minimum spread for S2 and a 0.02 minimum spread for S4. Therefore, the computer 101 selects the maximum of these spreads, or 0.02. The computer 101 then determines the allowable amount of the trade based upon the minimum and maximum values set by S3 for S2 and S4 respectively, such that the amount of the trade must be greater than the two minimums and subject to a cap equal to the lower of the two maximums. If all criteria are satisfied, the computer 101 executes a name switch enabling the transaction to be completed between S2 and S4 via S3.

1208: If multiple name switch options are identified by the computer 101, the computer evaluates the other name switch parameters of each name switching possibility (e.g., minimum spread, minimum and maximum size, and credit remaining parameters for each trading party) to identify a subset of available name switch candidates as described above in step 1207.

1209: The computer then selects a name switching entity from this subset using a selection process. For example, the selection process may be random, sequential, equal allocation, or any other appropriate selection process. Using a random selection process, the computer 101 selects from among the identified subset at random. Using a sequential selection process, the computer 101 selects the next available name switching party and rotates sequentially through the possible name switching parties. In an equal allocation selection process, the computer 101 determines the volume of name switching transactions that each name switching party has executed and attempts to equally allocate the name switching transactions between the available parties.

1210–1212: Once a name switch party is selected, the name switch is performed, the transaction is; automatically executed as described above, and the parties are notified accordingly.

1220: If no parties are available based on the name switching parameters, no transaction is executed.

A sample screen by which trading entities may enter credit and name switch parameters into the system is shown in FIG. 13. Using this screen, trading entities may enter credit limits for each potential counterparty, whether the trading entity is willing to name switch with that counterparty, and other name switch parameters for each counterparty.

The operation of the name switch feature of the system according to the present invention will now be described in detail with reference to FIGS. 14–18.

Figure 15:
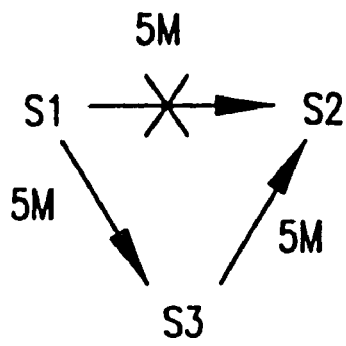
FIGS. 15–18 provide diagrams of four sample transactions used to illustrate the operation of the name switch feature of the electronic trading system of the present invention.

For a name switch to occur, there must be sufficient bilateral credit available both between the less credit-worthy trading entity and the more credit-worthy trading entity and between the more credit-worthy trading entity and the party with whom the less credit-worthy trading entity desires to trade. For example, with reference to FIGS. 14A–D, assume trading entity S1 enters the credit and name switch parameters shown in FIG. 14A. Similarly, trading entities S2, S3 and S4 respectively enter credit and name switch parameters shown in FIGS. 14B–D. Based on the parameters entered by trading entities S1–S4, the following sample transactions are desired by trading entity S1:

FIG. 15: A match is tentatively possible between trading entity S1 and trading entity S2 for an amount of $5M. In this example, trading entity S2 has no credit remaining with trading entity S1. Therefore trading entity S1 cannot trade directly with trading, entity S2. However, trading entity S2 has extended sufficient credit to trading entity S3. Also, trading entity S3 has agreed to name switch for trading entity S1, and trading entity S3 has extended sufficient credit to trading entity S1 and trading entity S2 to cover the transaction. Finally, trading entity S1 has extended sufficient credit to trading entity S3 to cover the transaction. Since there is sufficient bilateral credit between S1 and S3 and between S3 and S2, the name switch may take place (providing that the minimum spread and other parameters are satisfied as described above with reference to FIG. 12).

Figure 16:
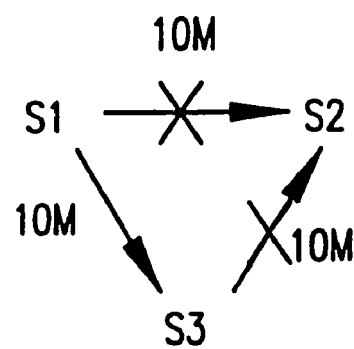

FIG. 16: A match is possible between trading entity S1 and trading entity S2 for an amount of $10M. Trading entity S1 cannot trade directly with trading entity S2 because trading entity S2 has not extended sufficient credit to trading entity S1. However, in this situation, trading entity S1 cannot name switch with trading entity S3 because trading entity S3 has not extended sufficient credit to trading entity S2 to cover the transaction.

Figure 17:
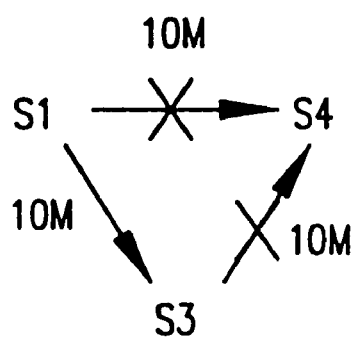

FIG. 17: A match is possible between trading entity S1 and trading entity S4 for an amount of $10M. Trading entity S1 cannot trade directly with trading entity S4 because trading entity S4 has not extended sufficient credit to trading entity S1. Also, trading entity S1 cannot name switch with trading entity S3 because trading entity S3 also does not have sufficient credit with trading entity S4.

Figure 18:
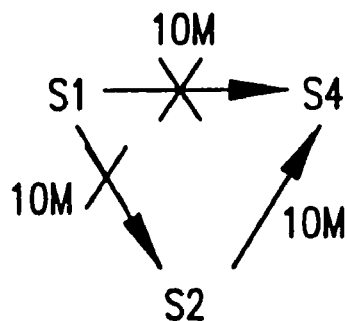

FIG. 18: A match is possible between trading entity S1 and trading entity S4 for an amount of $10M. Trading entity S1 cannot trade directly with trading entity S4 as discussed above with reference to FIG. 17. Further, trading entity S1 cannot name switch with trading entity S2 because trading entity S2 has not extended sufficient credit to trading entity S1 to cover the trade.

While the electronic trading system according to the present invention is capable of performing the name switch function based on a determination of bilateral credit availability, the system may also perform the name switch function based on unilateral credit availability as is appropriate for certain types of transactions.

The automatic name switch feature of the electronic trading system according to the present invention is also independent of any credit pre-filtering display function of the computer 101 or trader terminals (e.g., S1–S4).

The automatic name switch feature of the present invention may be based on pre-existing commercial relationships between trading parties rather than on a direct profit basis as the result of a price spread like the auto-arbitrage feature, or on a combination of the two incentives. One example of such a commercial relationship is an arrangement by which the more credit-worthy party charges the less credit-worthy party a fixed amount for each name switch transaction. The less credit-worthy party may agree to pay this to increase its available options in the market. Therefore, the name switch feature of the electronic trading system according to the present invention is based on user election (the user elects to credit lines switch), not system selection as is used for clearing houses in which credit risk is mutualized.

An optional feature of the system according to the present invention including auto-arbitrage and name switch features is a trade ticket output feed located at the trader terminals S1–S4 and/or the computer 101. One possible trade ticket output feed is described in U.S. Pat. No. 5,003,473.

In summary, the auto-arbitrage and name switch features of the electronic trading system according to the present invention employ similar network principles but address different market concerns. The auto-arbitrage feature enables trading entities to avail themselves of low-risk trading opportunities. The automatic name switch feature enables trading entities to benefit from commercial relationships with other better-known or better-ranked (credit-wise) trading entities. Both features benefit the system by increasing liquidity without the addition of new bids and offers by performing trades that otherwise would not be possible in the known systems due to credit limitations.

While the present invention has been particularly described with reference to the preferred embodiments, it should be readily apparent to those of ordinary skill in the art that changes and modifications in form and details may be made without departing from the spirit and scope of the invention. It is intended that the appended claims include such changes and modifications.

We claim:

1. An electronic trading system for traders, the system comprising:
a plurality of trader terminals for receiving credit parameter data for use in determining whether to permit a trade, for receiving from traders trading data including at least one of bid and offer information, and for receiving arbitrage parameter data from the traders comprising at least one of a minimum spread parameter, an average spread parameter, a minimum size parameter, and a maximum size parameter, said plurality of trader terminals including a first trader terminal, a second trader terminal and a third trader terminal;
a communications network in communication with the plurality of trader terminals;
a computer in communication with said plurality of trader terminals via said communications network, said computer matching trades using said credit parameter data;
a detector for automatically detecting potential related trades, said related trades being treated as contingent trades between said first trader terminal and said second trader terminal and between said first trader terminal and said third trader terminal, for creating an arbitrage opportunity based on credit-related discrepancies within a market where a direct trade between said second trader terminal and said third trader terminal would be unavailable and based on monitoring said trading data, said credit parameter data and said arbitrage parameter data; and
an executing circuit for executing all the detected contingent trades, the executing circuit including a locking circuit for locking trading data for all said contingent trades so as to lock all said contingent trades prior to execution of any of said contingent trades to ensure that said all contingent trades remain available during the execution of said contingent trades;
wherein said executing circuit only executes all the detected contingent trades if the trading data for all the detected contingent trades is locked.

2. The electronic trading system according to claim 1, wherein said executing circuit is adapted to automatically execute the detected contingent trades, the system further comprising a notification circuit for notifying the first trader terminal that contingent trades have been detected and executed and for providing the results of the execution of said contingent trades to the first trader terminal.

3. The electronic trading system according to claim 1, further comprising an alert circuit for generating an alert at the first trader terminal that contingent trades have been detected by said detector, said first trader terminal including an input for receiving an input indication from a trader indicating whether or not to execute said detected contingent trades and said executing circuit being responsive to the input indication for executing said contingent trades.

4. The electronic trading system according to claim 1, wherein said credit parameter data includes credit limit data for each trading counterparty to which said traders belong, from each other such counterparty.

5. The electronic trading system according to claim 1, wherein said detector is adapted to detect contingent trades based on each of said minimum spread parameter, said average spread parameter, said minimum size parameter, and said maximum size parameter.

6. The electronic trading system according to claim 1, wherein said detector is adapted to detect contingent trades which enable an original trade based on trading data requested by said second trader terminal and said third trader terminal when credit parameter data relating to said first trader terminal is sufficient with respect to the second and third trading trader terminals to complete said original trade, but a direct trade between the second trader terminal and said third trader terminal would nonetheless be unavailable.

7. The electronic trading system according to claim 1, wherein said detector is adapted to detect contingent trades which enable an original trade requested by said second trader terminal and said third trader terminal by allowing said second trader terminal to trade with said third trader terminal via said first terminal based upon the credit parameter data, if the credit parameter data indicates sufficient credit for the first trader terminal to trade with the second trader terminal and with the third trader terminal sufficient to complete said original trade, but indicates a direct trade between the second trader terminal and said third trader terminal would be unavailable.

8. A method for electronic trading using a computer and a plurality of terminals, the computer and plurality of trader terminals in communication via a communications network, the method comprising:
   receiving via said communications network, at said computer, from said plurality of trader terminals, credit parameter data, trading data and arbitrage parameter data, said trading data including bid and offer information, said arbitrage parameter data comprising at least one of a minimum spread parameter, an average spread parameter, a minimum size parameter and a maximum size parameter;
   storing said credit parameter data and said trading data via said computer;
   automatically detecting potential related trades via said computer, said potential related trades being treated as contingent trades between a first trader terminal and a second trader terminal of the plurality of trader terminals and between the first trader terminal and a third trader terminal of the plurality of trader terminals;
   creating an arbitrage opportunity via said computer based on credit-related discrepancies within a market if the computer determines a direct trade between the second trader terminal and said third trader terminal would be unavailable based on monitoring said trading data, said credit parameter data, and said arbitrage parameter data;
   locking trading data for all said contingent trades via said computer so as to lock all said contingent trades prior to execution of any of them, to ensure that said all contingent trades remain available during the execution of said contingent trades; and
   if said computer determines all said contingent trades are locked, executing said contingent trades.

9. The method according to claim 8, further comprising the computer notifying the first trader terminal that contingent trades have been detected and executed, said step of notifying including providing results of the execution of said contingent trades to the first trader terminal.

10. The method according to claim 8, further comprising:
   generating an alert at the first trader terminal that contingent trades have been detected by said detector;
   receiving an input indication at the first trader terminal from a trader whether to pursue or not pursue said detected contingent trades; and
   executing said detected contingent trades in dependence upon the input indication.

11. The method according to claim 8, wherein said credit parameter data includes a first credit limit for a first potential trading counterparty associated with the first trader terminal with respect to a second potential trading counterparty associated with the second trader terminal and a second credit limit for the first potential trading counterparty with respect to a third potential trading counterparty associated with the third trader terminal.

12. The method according to claim 11, wherein said credit parameter data further includes a third credit limit for the second potential trading counterparty with respect to the third potential trading counterparty and a fourth credit limit for the second potential trading counterparty with respect to the first potential trading counterparty.

13. The method according to claim 11, wherein said credit parameter data further includes a fifth credit limit for the third potential trading counterparty with respect to the first potential trading counterparty and a sixth credit limit for the third potential trading counterparty with respect to the second potential trading counterparty.

14. The method according to claim 11, wherein the determination of contingent trades is based on each of said minimum spread parameter, said average spread parameter, said minimum size parameter and said maximum size parameter.

15. A computer for use in an electronic trading system, the computer comprising:
   a network interface for connecting to a plurality of trader terminals via a communications network, for receiving credit parameter data, trading data and arbitrage parameter data from said of trader terminals, said trading data including bid and offer information, said arbitrage parameter data comprising at least one of a minimum spread parameter, an average spread parameter, a minimum size parameter and a maximum size parameter;
   a matching circuit for matching trades using said credit parameter data;
   a detector for automatically detecting potential contingent trades between a first trader terminal and a second trader terminal and between the first trader terminal and a third trader terminal making up an arbitrage opportunity created by credit-related discrepancies within a market where a direct trade between said second trader terminal and said third trader terminal would be unavailable by the computer based on said credit parameter data, said detecting based on monitoring said trading data, credit parameter data, and said arbitrage parameter data; and an executing circuit for executing said contingent trades; and a locking circuit for locking trading data for all said contingent trades so as to lock all said contingent trades prior to execution of any of said contingent trades to ensure that said all contingent trades remain available during the execution of said contingent trades;

wherein said executing circuit is adapted to perform said contingent trades only if trading data for all said trades is locked.

16. A computer according to claim 15, wherein said executing circuit is adapted to automatically execute the detected contingent trades, the computer further comprising a notification circuit for notifying the first trader terminal that contingent trades have been detected and executed, and for providing the results of the execution of said contingent trades to the first trader terminal.

17. The computer according to claim 15 further comprising:

an alert circuit for generating an alert notification for transmission to said trader terminals notifying that contingent trades have been detected by said detector; and an input for receiving an input indication from a trader indicating whether or not to execute said detected contingent trades;

wherein said executing circuit is responsive to the received input indication to perform the execution of said contingent trades in dependence upon the received input indication.

18. The computer according to claim 15, wherein said credit parameter data includes credit limit data for each trading counterparty to which said traders belong, from each other such counterparty.

19. The computer according to claim 15, wherein said detector is adapted to detect contingent trades based on each of said minimum spread parameter, said average spread parameter, said minimum size parameters, and said maximum size parameter.

20. The computer according to claim 15, wherein said detector is adapted to detect contingent trades which enable an original trade based on trading data requested by said second trader terminal and said third trader terminal, where credit parameter data relating to said first trader terminal is sufficient in respect of the second and third trader terminals to complete said original trade, but a direct trade between the second trader terminal and said third trader terminal would be unavailable.

* * * * *